Jan. 16, 1945.  L. F. STROUT  2,367,447
HOSE COUPLING
Filed Oct. 10, 1942
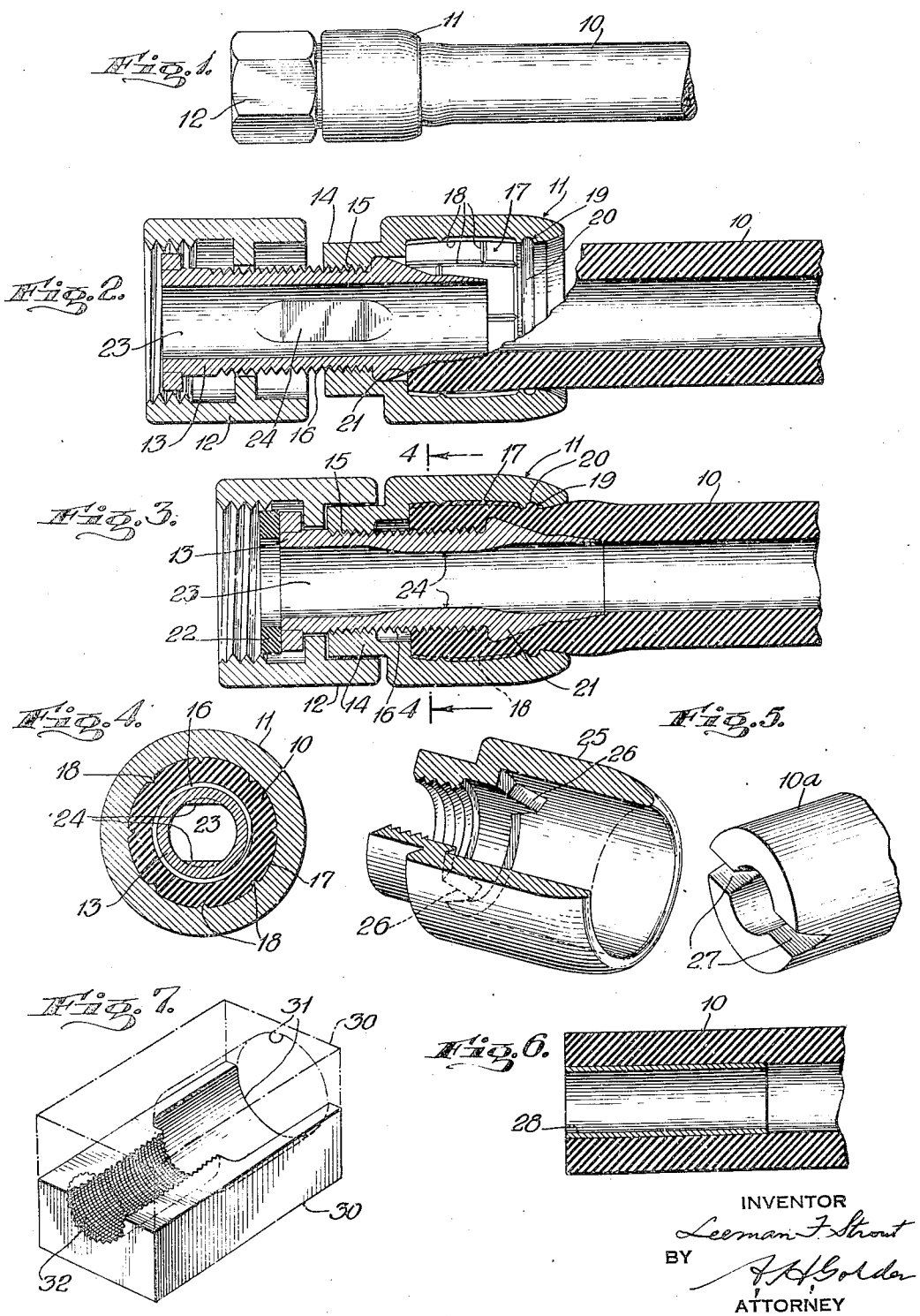
INVENTOR
Leeman F. Strout
BY
F. H. Golder
ATTORNEY Patented Jan. 16, 1945

2,367,447

UNITED STATES PATENT OFFICE 2,367,447

HOSE COUPLING

Leeman F. Strout, Stamford, Conn., assignor to
F. A. Bartlett Tree Expert Company, Stamford,
Conn., a corporation of Connecticut Application October 10, 1942, Serial No. 461,544

2 Claims. (Cl. 285—86)

This invention relates to a hose coupling, and more particularly to means whereby the parts of a hose coupling are secured to a flexible hose, as for example, a hose made of fabric and rubber. More particularly, my invention relates to that type of hose coupling in which a coupling body having an internal bore is adapted for assembly to a flexible hose.

A feature of my invention resides in means whereby the end of a flexible hose is forced against the surface of the internal bore of the coupling body to form a tight union therebetween. More particularly, this feature of my invention includes an expander for expanding the end of the flexible hose against the surface of the internal bore of the coupling body.

As a further feature of my invention, the means for expanding the end of the hose against the surface of the internal bore of the coupling body preferably takes the form of what may be termed a coupling sleeve that is in screw threaded relation to the coupling body, and is provided with an expander portion that is adapted to move axially into the end of the flexible hose as the said sleeve is rotated on its threads relatively to the coupling body.

A still further feature of my invention resides in the construction of the coupling sleeve whereby it may be readily rotated on its screw threads relatively to the coupling body into expanding relation to the end of the hose.

I have found that the axial and rotary movement of the expander portion as set forth supra, will tend to rotate that portion of the hose that is within the internal bore of the coupling body and thus tend to twist the end of the hose so as to distort it and even fracture it.

A further feature of my invention resides in the provision of means for restraining the end of the hose against rotation relatively to the coupling body as the expander portion is driven home. A more particular feature of this part of my invention resides in the provision of means formed on the surface of the bore of the coupling body for cooperation with the end of the hose to restrain the hose against rotation.

A further feature of my invention resides in the provision of a protective sleeve to be inserted in the end of the hose so as to protect the hose against injury by the expander portion as it is driven home.

Still a further feature of my invention resides in a special fixture adapted for cooperation with my hose coupling for maintaining in fixed relation the coupling body and the hose immediately outside the coupling body as the coupling sleeve is rotated to expand the end of the hose, all as heretofore set forth.

I have thus outlined the several more important features of my invention in order that the detailed description which follows may be better understood, and in order that my contribution to the art may be better appreciated. Those skilled in the art will of course understand that the basic conception on which my invention is based may be embodied in structures of physical form other than those that I shall herein describe. It is therefore important that the claims to be granted me shall be sufficiently broad to prevent the adoption and utilization by others of the basic conception of my invention in such other physical forms.

For a description of my invention I shall refer to the drawing wherein Fig. 1 is a view showing the hose coupling of my invention assembled to the end of a hose. Fig. 2 is a vertical view through the assembly of Fig. 1 but showing the parts before the expander portion of the coupling sleeve has been driven home to force the hose against the surface of the internal bore of the coupling member. Fig. 3 shows the parts of Fig. 2 when the coupling sleeve has been driven home. Fig. 4 is a section along lines 4—4 of Fig. 3. Fig. 5 is an exploded view of a modified form of the coupling body and the end of a rubber hose particularly adapted for cooperation with this form of coupling body. Fig. 6 shows in section the insertion of a protective sleeve within a flexible hose. Fig. 7 illustrates the fixture used for assembling the coupling of my invention to the end of a hose.

Referring now more particularly to the drawing and especially Figs. 1, 2 and 3, a flexible hose of the class well known in the art is designated by reference numeral 10 while the bored coupling body forming part of my invention is illustrated by reference numeral 11. A coupling nut is designated by reference numeral 12 and is shown rotatable on a coupling sleeve 13 for the purpose of securing the coupling sleeve 13 to a second piece of hose or a screw threaded faucet as the case may be.

The coupling body 11 is formed with a necked sleeve portion 14 that is internally screw threaded at 15 for cooperation with screw threads 16 formed on coupling sleeve 13. The main part of the coupling body 11 is also sleeve-like in form and has a relatively large internal bore whose surface is designated generally by reference numeral 17 and is preferably formed with a series of ridges 18 that may assume the various positions on the surface 17 shown best in Fig. 2. What may be termed a sealing surface on the coupling body is designated generally by reference numeral 19 and may include a groove 20 into which the hose is forced (Fig. 3) when expanded against the surface 17 of the internal bore as will be described presently.

As well shown in Figs. 2 and 3 the coupling sleeve 13 has formed thereon a cone-shaped expander portion 21 that in the initial assembly of the parts in Fig. 2 is partially inserted within the hose 10. If now, the coupling sleeve be rotated, its screw threaded relation to the coupling body 11 will effect axial movement thereof from its position of Fig. 2 to its position of Fig. 3 wherein it will be noted that its expander portion 21 has forced the surface of the hose 10 against the surface 17 of the coupling body so as to form a very tight seal between the two. It will be appreciated that during this rotation of the coupling sleeve 13, the end of the hose 10 has been maintained against rotation by the several ridges 18 and has thus prevented a twisting of the hose and a consequent deformation thereof. In Fig. 3, a washer 22 is shown inserted against the end of the coupling sleeve 13 so that the coupling sleeve may be assembled relatively to a faucet or other coupling member by the nut 12 all as is well known to those skilled in the art.

For rotating the coupling sleeve relatively to the coupling body 11, the internal bore 23 of the coupling sleeve has a pair of flattened surfaces 24. It is obvious that any square tool inserted into the bore 23 of the coupling sleeve will cooperate with the surfaces 24 so that the said coupling sleeve may be rotated. The formation of the surfaces 24 is probably best illustrated in Fig. 4. In this figure there is also well illustrated the coaction between the ridges 18 and the hose 10 for maintaining the hose and coupling body against relative rotation as the coupling sleeve 13 is driven home.

In Fig. 5 a modified form of coupling member is illustrated, and is designated by reference numeral 25. Instead of having ridges 18 formed to prevent rotation of the end of the rubber hose, two or more V-shaped lugs 26 may be formed within the coupling body. These lugs preferably coact with similarly shaped cut out portions 27 formed on the end of the hose 10a to maintain the hose against rotation when the coupling sleeve 13 is rotated. It is obvious that lugs 26, or lugs similar thereto may be used either alone or in combination with ridges 18 for preventing the rotation of the hose. The type of means to be used for preventing rotation of the hose will depend to a considerable extent on the thickness and strength of the hose that is used, and in some cases may not be required at all.

In Fig. 6, the hose 10 is shown with a protective sleeve 28 inserted therein. This protective sleeve may be formed of metal such as lead, it being obvious that the lead sleeve 28 will readily be deformed by the expander portion 21 of the coupling sleeve 13 while acting to protect the hose against abrasion by the coupling sleeve as it is rotated while being driven home.

In Fig. 7 I show a fixture for assembling the parts of a coupling of my invention relatively to the end of a hose. In this figure, the fixture is shown formed of duplicate parts 30, the assembling of which yields a relatively large bore 31 and a relatively small bore 32. The relatively small bore 32 is corrugated for cooperation with the end of the hose 10 that protrudes from the coupling body 11. The relatively large bore 31 is adapted for cooperation with the coupling body itself, it being obvious that when the two parts 30 are clamped together, the hose and coupling body will each be maintained against rotation. The insertion of a square tool against the flat surfaces 24 of the bore 23 of coupling sleeve 13, will allow for rotation of the coupling sleeve 13 to drive the expander portion 21 to the position of Fig. 3. During this rotation of the coupling sleeve 13, it is obvious that both the coupling body and the hose outside the coupling body will be maintained against rotation. It is of course clear that preferably during this rotation of the coupling sleeve 13, that portion of the hose within the coupling body 11 is also maintained against rotation by the several means suggested so that there will be no twisting of the hose or consequent deformation of the same.

I believe that the operation and construction of my invention will now be quite clearly understood.

I now claim:

1. In a hose coupling, an internally bored coupling body adapted for assembly to the end of a flexible hose, a substantial length of the end of said hose fitting into the internal bore of said coupling body for assembly thereto, a coupling sleeve in screw threaded relation to said coupling body, a threaded nut mounted about said coupling sleeve, means whereby said sleeve holds said nut against endwise removal from said sleeve, a hose expander portion on said coupling sleeve adapted for axial movement in the internal bore of said coupling body when said sleeve is rotated on said screw threads relatively to said coupling body, a squared portion formed in the bore of said sleeve for cooperation with a tool inserted through said threaded nut into said sleeve whereby said sleeve is rotated relatively to said body, said axial movement of said sleeve effecting the movement of said expander portion internally of said hose end whereby to expand said hose end against the surface of the internal bore of said coupling body to form a tight joint between said hose and coupling body.

2. In a hose coupling, an internally bored coupling body adapted for assembly to the end of a flexible hose, a substantial length of the end of said hose fitting into the internal bore of said coupling body for assembly thereto, a coupling sleeve in screw threaded relation to said coupling body and having a hose expander portion adapted for axial movement in the internal bore of said coupling body when said sleeve is rotated on said screw threads relatively to said coupling body, said axial movement of said sleeve effecting the movement of said expander portion internally of said hose end whereby to expand said hose end against the surface of the internal bore of said coupling body to form a tight joint between said hose and coupling body, and a protective sleeve of relatively plant material within the said hose end relatively to which said expander portion moves whereby said protective sleeve protects said hose from injury by the said expander portion.

LEEMAN F. STROUT.